United States Patent [19]

Steere, Jr.

[11] Patent Number: 5,185,956
[45] Date of Patent: Feb. 16, 1993

[54] WAFER SLICING AND GRINDING SYSTEM

[75] Inventor: Robert E. Steere, Jr., Boonton, N.J.

[73] Assignee: Silicon Technology Corporation, Oakland, N.J.

[21] Appl. No.: 525,466

[22] Filed: May 18, 1990

[51] Int. Cl.⁵ .............................................. B24B 27/06
[52] U.S. Cl. ...................................... 51/5 C; 51/165.9; 51/168; 125/13.02; 81/57.3; 81/57.36
[58] Field of Search .............. 51/5 C, 5 B, 34 J, 73 R, 51/166 TS, 165.9, 168; 125/13.02, 15; 81/57.3, 57.32, 57.36, 57.14

[56] References Cited

U.S. PATENT DOCUMENTS

| | | | |
|---|---|---|---|
| 1,503,102 | 7/1924 | Alsted | 51/209 R |
| 2,661,580 | 12/1953 | Crompton, Jr. | 51/34 J |
| 2,716,312 | 8/1955 | Speicher | 51/168 |
| 3,133,462 | 5/1964 | Whipp | 81/57.3 |
| 3,636,664 | 1/1972 | Price | 51/165.9 |
| 4,852,304 | 8/1989 | Honda et al. | 51/5 C |
| 4,881,518 | 11/1989 | Feldmeier | 51/5 C |
| 4,896,459 | 1/1990 | Brandt | 51/5 C |

FOREIGN PATENT DOCUMENTS

| | | | |
|---|---|---|---|
| 2469259 | 5/1981 | France | 51/5 B |
| 0196943 | 11/1983 | Japan | 81/57.36 |
| 0188074 | 8/1986 | Japan | 51/168 |

Primary Examiner—Robert A. Rose
Attorney, Agent, or Firm—Francis C. Hand

[57] ABSTRACT

The grinding wheel is provided with a plurality of circumferentially spaced apart micrometer screws which can be adjusted from time to time in order to index the grind wheel into different grinding positions. An indexing mechanism can be mounted on the face of the disk with drive pins extending through the disk into the micrometer screws for simultaneous rotation of the screws. The indexing mechanism is lightweight and can be readily attached to the face of the grind disk.

23 Claims, 6 Drawing Sheets

WAFER SLICING AND GRINDING SYSTEM

This invention relates to a wafer slicing and grinding system. More particularly, this invention relates to a grinding system for a wafer slicing machine.

As is known, various types of structures have been used for the slicing of wafers, such as silicon wafers from ingots, for example, cylindrical ingots of silicon. For example, U.S. Pat. No. 4,420,909 describes a wafering system wherein wafers can be severed from an ingot using an internal diameter saw blade.

It has also been known that the slicing of wafers from ingots does not always produce a wafer with flat parallel front and back surfaces. Accordingly, in many cases, it has been necessary to grind one or more of the surfaces in order to obtain flat surfaces for the further processing of the wafers, for example into semi-conductor chips. To this end, various proposals have been made for grinding the ingot face prior to or simultaneously with the slicing of a wafer so that at least one face of the wafer is flat. For example, U.S. Pat. No. 4,852,304 describes a system in which an ingot would be moved relative to a rotating cutting blade as well as a rotating grindstone so that a wafer is sliced from the ingot while being ground on one side at the same time. In an alternative embodiment, the ingot would be cut by the saw blade and thereafter the exposed face ground by a separately mounted grindstone.

German Patent Application O.S. 36 13 132 describes a system wherein, after a wafer has been sliced by a saw blade, the front face of the ingot is ground by a grinding wheel which projects through the opening of the saw blade.

However, the mechanisms for moving the grindstone described in U.S. Pat. No. 4,852,304 and the grinding wheel of German O.S. 36 13 132 are not readily apparent but appear to be centrally disposed. In such cases, the grindstones can be tilted during operation so that a precisely, flat face in a perpendicular plane cannot be achieved.

It has also been known from pending U.S. patent application Ser. No. 07/353,879, filed May 18, 1989 to provide a slicing and grinding system for a wafer slicing machine wherein a wafer slicing operation and an ingot grinding operation can be performed sequentially in a single cycle of the machine. In addition, provision can be made for moving a grind wheel coaxially of a saw blade between a retracted position and an extended position beyond the saw blade for grinding the surface of an ingot.

In some cases, it is required to simultaneously slice a wafer from an ingot while grinding the front surface of the wafer being sliced. In such cases, difficulties have arisen in precisely indexing the axial position of the face of the grind wheel in order to grind the wafer. These difficulties have been compounded where the mechanisms used for adjusting a grind wheel are disposed behind the grind wheel relative to the position of the ingot.

Accordingly, it is an object of the invention to precisely index a grind wheel of a grinding system for a wafer slicing machine.

It is another object of the invention to be able to retrofit existing slicing machines with a grind wheel which can be readily indexed axially.

It is another object of the invention to be able to adjust a grinding stage of a grinding and slicing machine to different thicknesses of wafers to be sliced.

It is another object of the invention to be able to adjust a grind wheel of a grinding and slicing machine in a relatively easy manner.

It is another object of the invention to provide a relatively simple mechanism for indexing a grind wheel in a wafer slicing machine.

Briefly, the invention provides a slicing and grinding system for a wafer slicing machine wherein a wafer slicing operation and an ingot grinding operation can be performed simultaneously in a single cycle of the machine.

The system includes a rotatably mounted internal diameter saw blade for slicing a wafer from a face of an ingot, a rotatably mounted grind wheel coaxially mounted relative to the blade on a common axis for simultaneously grinding a front surface of a wafer being sliced from the ingot, a plurality of adjusting means for adjusting an extended position of the grind wheel relative to a plane of the front face of the wafer to be sliced and means for simultaneously actuating the adjusting means to precisely index the grind wheel longitudinally of the common axis.

The wafer slicing machine also includes a spindle housing and spindle of conventional construction on which the saw blade is mounted.

In addition, an adaptor is mounted on the spindle of the machine for rotation therewith while the saw blade is mounted on the adaptor. The grind wheel is also secured to the spindle for rotation therewith coaxially of the saw blade while a means is provided for moving the grind wheel coaxially of the spindle between a retracted position and an extended position for grinding the surface of the ingot.

The grind wheel may be constructed as a disc having a raised rim defining an annular grinding surface for grinding a leading face of the ingot and a rod which is secured to the disc and movably received in the spindle.

The means for moving the grind wheel employs an annular sleeve-like piston secured to the disc of the grind wheel and received in an annular chamber in the adapter. This piston serves to guide the grind wheel between the retracted and extended positions. In addition, the means for moving the grind wheel supplies a pressurized fluid to the chamber in the adaptor in order to expel the piston so as to move the grind wheel to the extended position. The means for moving the grind wheel also includes a spring which is secured between the rod and the spindle in order to bias the rod into the spindle so as to move the grind wheel to the retracted position.

Each adjusting means includes a stop adjustably mounted in the adaptor for abutting the sleeve-like piston in the extended position of the grind wheel. The stop is in the form of a threaded micrometer screw which can be accessed through openings in the grind wheel.

The invention also provides a relatively simple mechanism for indexing a grind wheel. This mechanism is in the form of a gear head which can be brought to the opposite side of the grind wheel from the adjusting means in order to simultaneously actuate the adjusting means for precisely indexing the grind wheel.

The indexing mechanism includes a housing, means for releasably engaging the housing with the grind wheel in order to lock the housing to the grind wheel, a plurality of circumferentially disposed drive pins which project from and which are rotatably mounted in the housing for engaging in the respective adjusting means for controlling a grinding position of the grind wheel and means in the housing for rotating the pins simultaneously in order to adjust the adjusting means.

The means for releasably engaging the housing of the indexing mechanism with the grind wheel may include a plurality of circumferentially spaced expandable locking bushings which project from the housing and which are able to fit into a plurality of circumferentially spaced recesses in the grind wheel.

The means in the housing of the indexing mechanism for rotating the pins may include a manually rotatable knob which projects from the housing and a transmission within the housing between the knob and the drive pins for rotating the pins in unison with the knob. A digital counter may also be provided for visually displaying the degree of rotation of the knob and, thus, a calibrated adjusted axial position for the grind wheel.

In use, the indexing mechanism is brought to the face of the grind wheel prior to performance of a slicing and grinding operation. At this time, the housing of the indexing mechanism is fitted to the face of the grind wheel and secured in place. Next, the locking pins which are retractably mounted in the housing are pushed forwardly into and through access openings of the grind wheel into engagement with the micrometer screws. To this end, each micrometer screw is provided with a hexagonal bore for receiving a hexagonal shaped drive pin in mating relation. After placement of the drive pins, each drive pin is clamped in place and the knob on the indexing mechanism manually rotated so as to move the micrometer screws simultaneously into new positions. In this way, when the grind wheel is again extended, the grind wheel will take up a new grinding position.

After the extended position for the grind wheel has been set, the slicing machine is operated such that the saw blade is moved relative to an ingot mounted on a stationary axis, such as a horizontal axis. In this respect, the grind wheel is moved to the extended grinding position so as to grind the front face of the ingot, that is, the wafer to be sliced. As the saw blade that moves downwardly to cut through the ingot to form a wafer of a desired thickness, the wafer is simultaneously ground on the front face.

These and other objects and advantages of the invention will become more apparent from the following description taken in conjunction with the accompanying drawings wherein.

Figure 1:
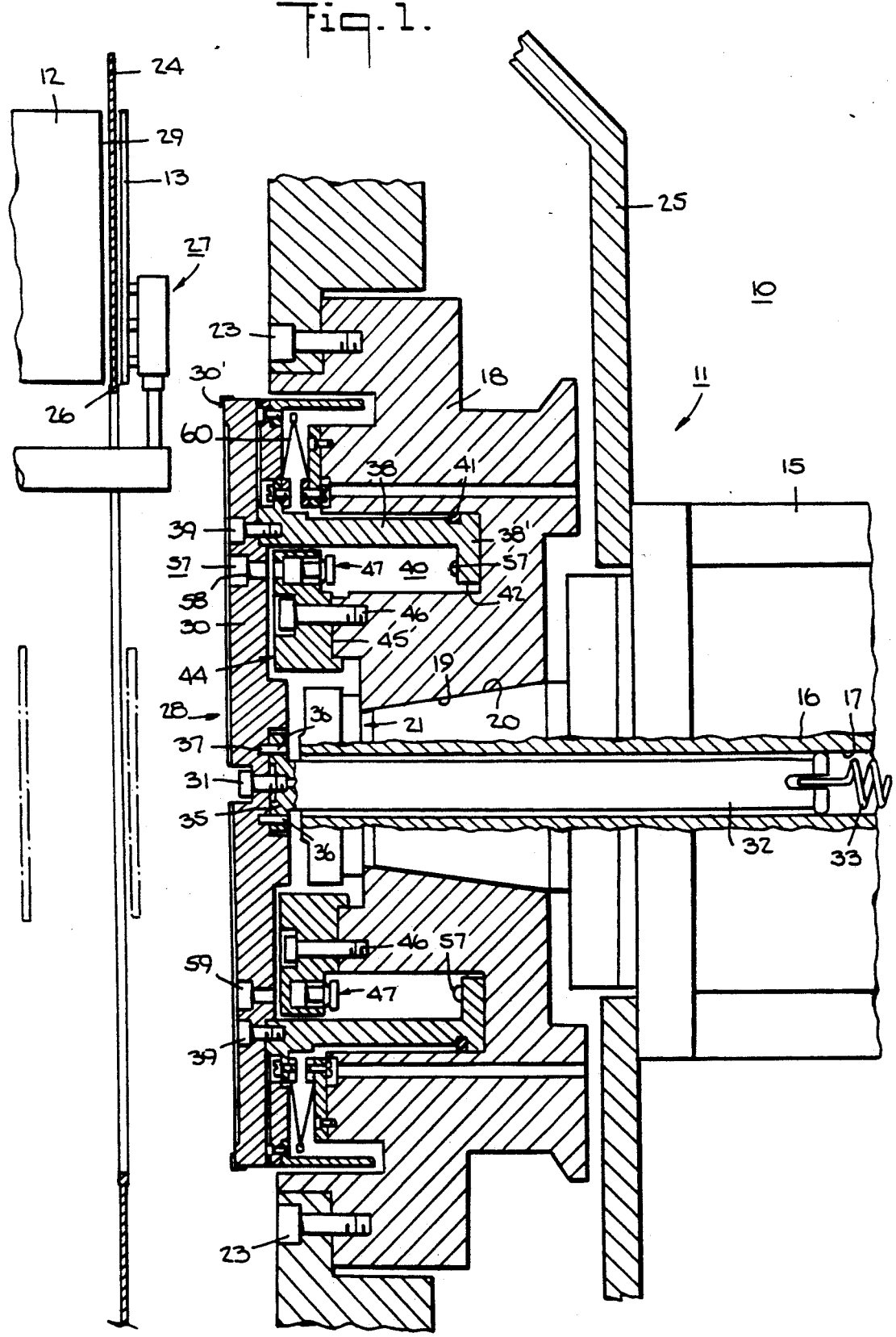
FIG. 1 illustrates a cross sectional view of a slicing and grinding system for the wafer slicing machine of FIG. 1 in accordance with the invention.

Referring to FIG. 1, the wafer slicing machine 10 is provided with a slicing and grinding system 11 for slicing wafers with a ground surface from an ingot 12. In this respect, the ingot 12 is a circular ingot, for example, made of silicon.

As illustrated, the slicing and grinding system 11 includes a housing 15 in which a spindle 16 is rotatably mounted in known manner. The spindle 16 has a hollow central bore 17 disposed on a longitudinal axis and extends from the housing 15. In addition, a spindle nose adaptor 18 is mounted via a tapered bore 19 on a tapered surface 20 at the end of the spindle 16 so as to be rotatable therewith. As indicated, a lock nut and washer assembly 21 is threaded onto the end of the spindle 16 to lock the adaptor 18 in place.

A wheel head 22 is secured to the adaptor 18 as by a plurality of circumferentially distributed bolts 23. This wheel head 22, in turn, carries an internal diameter saw blade 24 in a known manner. A backing plate 25 shrouds the wheel head 22 (see FIG. 1) and extends from the front of the wheel head 22 rearwardly to the spindle housing 15 and is attached thereto.

During rotation, the spindle 16, wheel head 22 and saw blade 24 rotate in unison about the axis of the spindle 16.

In known manner, the spindle housing 15 is movable, for example, vertically as viewed in FIG. 1 relative to the ingot 12 which is, thus, mounted on a fixed horizontal axis. Suitable means (not shown) are also provided for indexing the ingot 12 forwardly into the plane of the saw blade 24. As indicated in FIG. 1, the saw blade 24 has an internal bore about which an annular cutting edge 26 is provided.

Referring to FIG. 1, a suitable pick-off assembly 27 such as described in U.S. Pat. No. 4,420,909 is provided in order to remove a wafer 13 which has been severed from the ingot 12 by the saw blade 24, for example through the bore of the saw blade 24.

A grind wheel 28 is also mounted on the spindle 16 coaxially of the saw blade 24 for rotation therewith for grinding an exposed face 29 of the ingot 12. The grind wheel 28 includes an annular disc 30 which is removably mounted as by a bolt 31 on a central rod 32. This disc 30 has a raised rim 30' defining a grinding surface to grind the face 29 of the ingot 12. As indicated, the rod 32 is movably received in the bore 17 of the spindle 16 and is biased into the spindle 16 by a spring 33 which is secured to and between the rod 32 and the spindle 16. As shown, the rod 32 is solid and has a T-shaped cross section at a forward end. A plurality of guide pins 36 are fixed into the forward end of the rod 32 and are received in blind bores 37 in the disc 30 while the bolt 31 threads into a central internally threaded bore in the rod 32.

Figure 6:
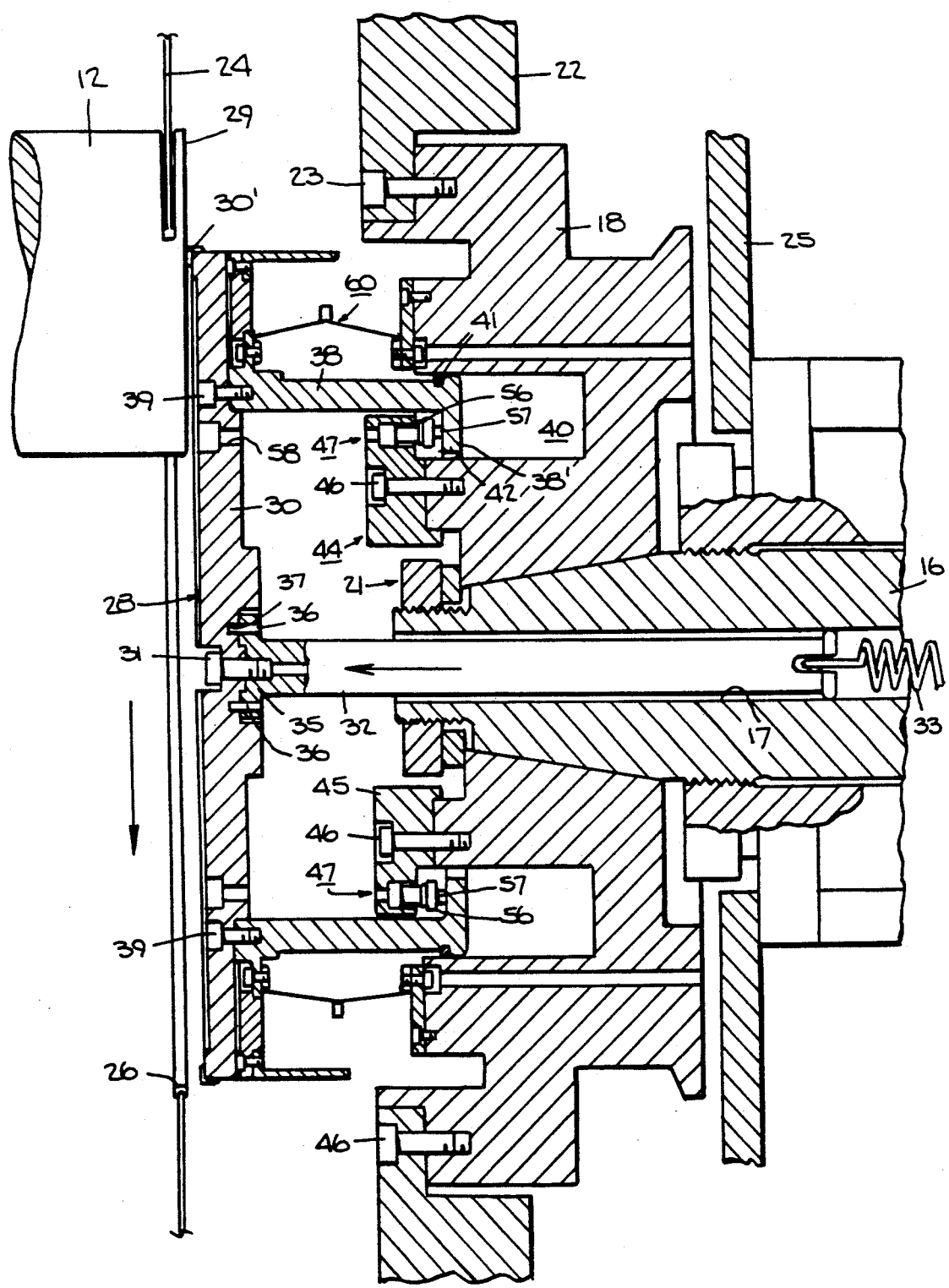
FIG. 6 illustrates the slicing and grinding system in operation on an ingot.

A means is also provided for moving the grind wheel 28 between a retracted position as shown in FIG. 1 and an extended position as shown in FIG. 6 for grinding the face 29 of the ingot 12. To this end, a sleeve-like piston 38 is secured as by a plurality of circumferentially disposed bolts 39 to the disc 30 and is received within an annular chamber 40 within the adaptor 18. As indicated, a seal ring 41 is provided between the outer surface of the piston 38 and the chamber 40 while an inwardly directed rim or flange 38, of the piston 38 has an innermost diameter larger than the inner diameter of the chamber 40 so as to provide a narrow gap or passageway 42 therebetween. The means for moving the grind wheel 28 includes a supply of compressed fluid such as compressed air (not shown) and an inlet connection (not shown) in the spindle 16 by means of which the compressed fluid may be introduced into the internal bore 17 of the spindle 16. The bore 17 thus provides a first passageway for the compressed fluid which communicates with a chamber defined by the sleeve like piston 38. This chamber, in turn, communicates with the passageway 42 defined between the piston 38 and the chamber 40. Upon introduction of the pressurized fluid, the piston 38 is caused to move to an extended position as illustrated in FIG. 6.

Referring to FIG. 1, an adjustable stop 44 is secured to the adaptor 18 for abutting the piston 38 in the extended position. As described in the copending patent application, the stop 44 is in the form of an annular ring 45 which is secured to the adaptor 18 by a plurality of bolts 46 to project into the path of the inwardly directed rim 38' of the piston 38. In addition, the ring 44 has a plurality of circumferentially spaced fine adjustment means 47 for adjusting the extended position of the piston 38 and thus the grind wheel 30.

Figure 5:
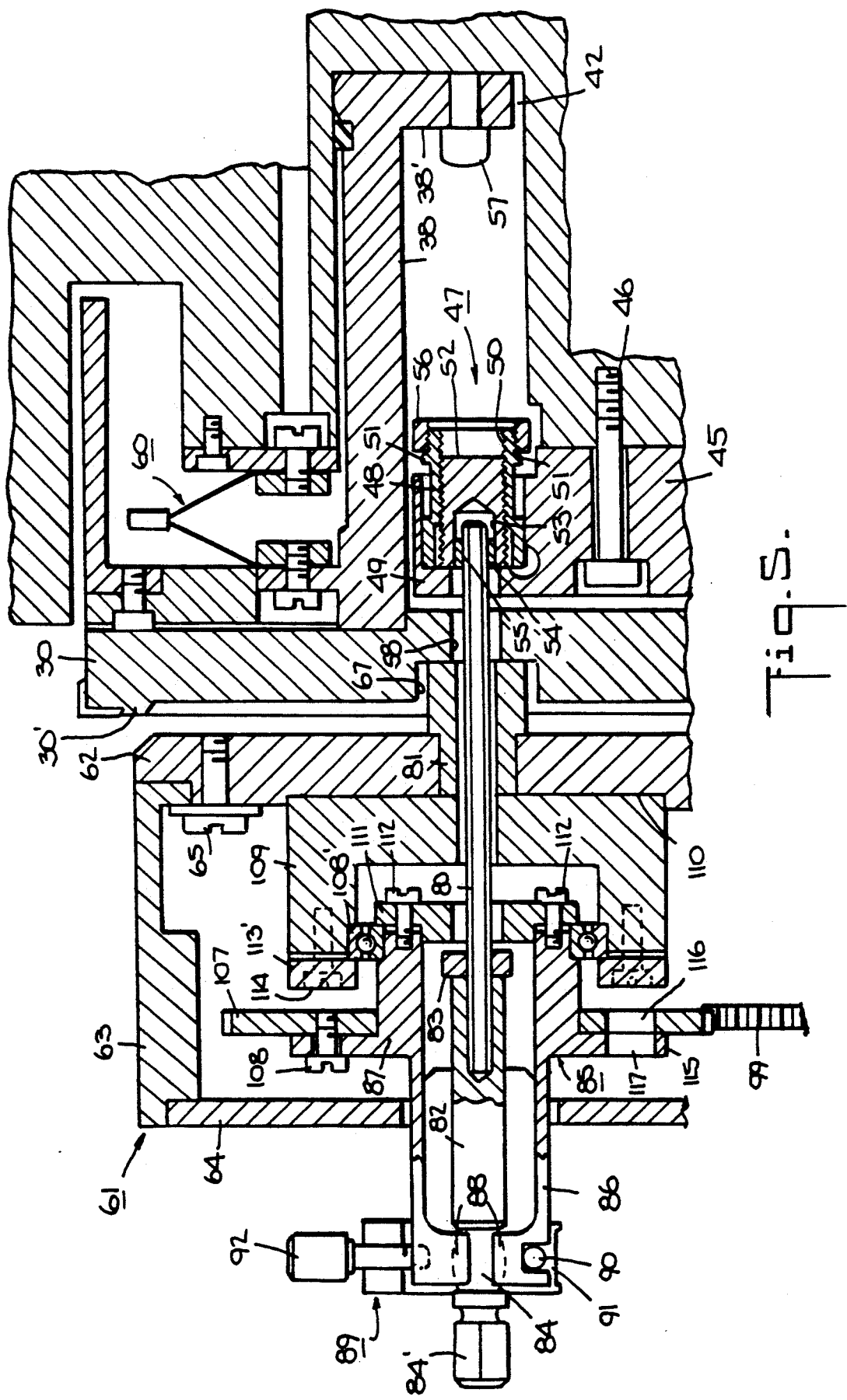
FIG. 5 illustrates an enlarged cross sectional view of a drive pin in a micrometer adjusting screw in accordance with the invention.

Referring to FIG. 5, each adjusting means 47 includes a sleeve-like micrometer body 48 which extends from within a radially directed enlargement or ear 49 of the ring 45.

The body 48 is provided with a plurality of slots (not shown) to form a split portion which is also provided with an internal thread 50 and an annular raised collar 51. Each adjustment means 47 also has an externally threaded micrometer screw 52 threadably engaged within the split portion of the sleeve-like body 48. This screw 52 has a blind bore 53 at one end in which a locking ring 54 is fixedly mounted and which has a hexagonal shaped bore 55. A friction adjustment ring 56 is threaded onto the outside of the split sleeve-like body 48 in order to retain the screw 52 therein by friction.

Upon rotation, the micrometer screw 52 moves relative to and within the sleeve-like body 48 more or less relative to a projecting stop 57 on the rim portion of the piston 38 which is sized to fit into the sleeve-like body 48.

The micrometer body 48 is provided with a pair of diametrically opposed threaded openings (not shown) which are adapted to receive nylon screws (not shown) which pass transversely through the ear 49 from opposite sides in order to lightly engage the screw 52 to provide friction. This assures that the micrometer screw 52 does not lose adjustment when turned out of the range of friction generated by the friction adjustment ring 56. The nylon screws may be trimmed flush with the outside of the body 48.

The collar 51 is beveled to act as a wedge in concert with the ring 56 to remove clearance of thread and to provide a slight friction to keep micrometer screw adjustment.

The grind disc 30 is provided with a plurality of access openings 58 in the form of threaded bores in which access screws or plugs 59 are provided (see FIG. 1). These openings 58 are aligned with the screws 52 in the enlarged portions 49 of the stop ring 45. Hence, upon removal of the screws 59, a tool such as described below can be used to turn the micrometer screws 52 without removing the grind wheel disc 30.

The piston 38 is provided with three internal longitudinal grooves (not shown) which terminate at the rim 38' and which guide the enlargement portions 49 therein to prevent rotation of the piston 38 relative to the ring 45. One of the enlargement portions 49 carries a projecting stop (not shown) on each side to abut the side walls of a groove.

Referring to FIG. 1, an expandable bellows seal 60 is disposed about the piston 38 and is secured between and indirectly to the grind wheel disc 30 and the adaptor 18 as described in the copending patent application.

Figure 2:
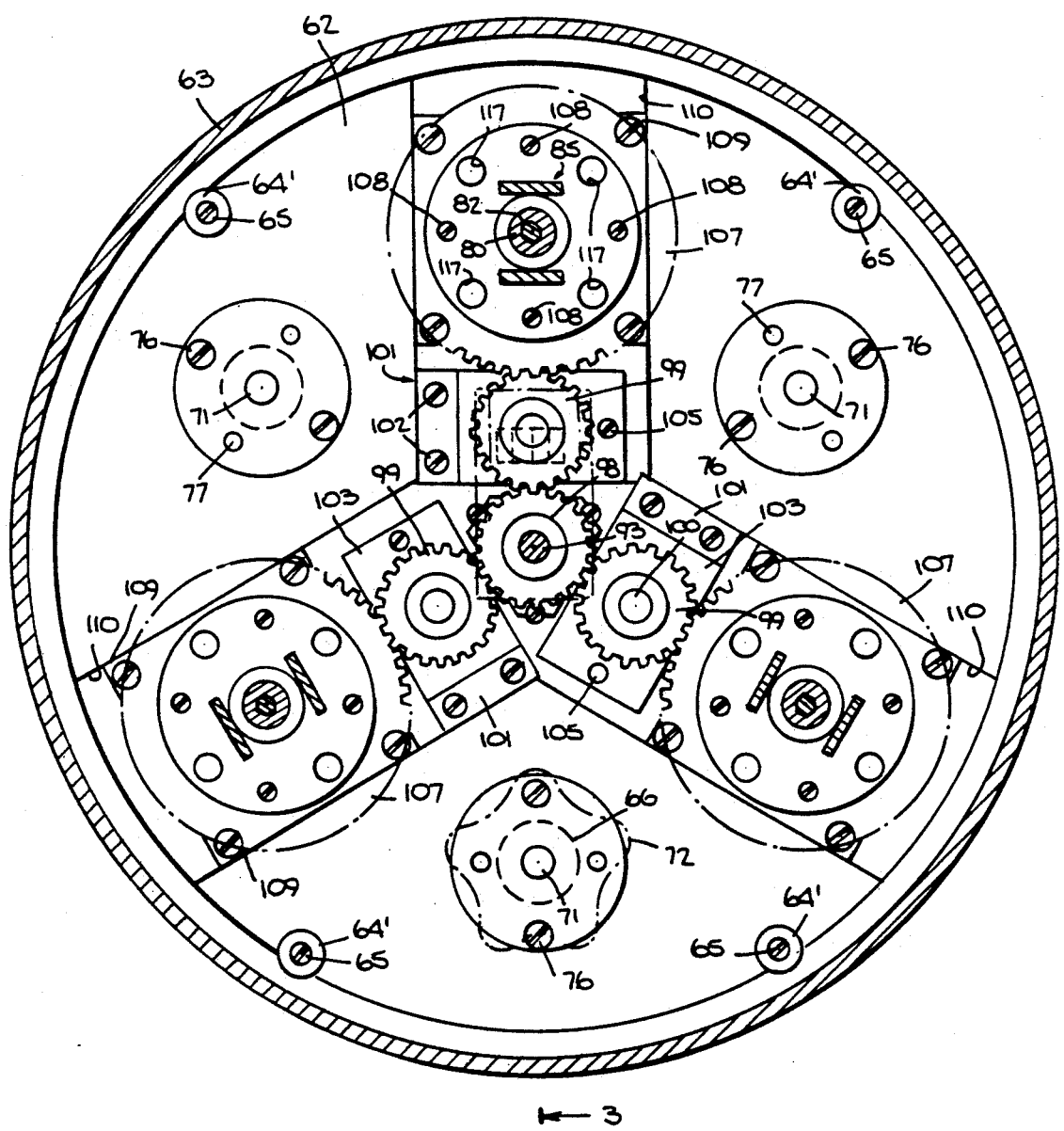
FIG. 2 illustrates a cross-section view of an indexing mechanism for adjusting the position of a grind wheel in accordance with the invention.
Figure 3:
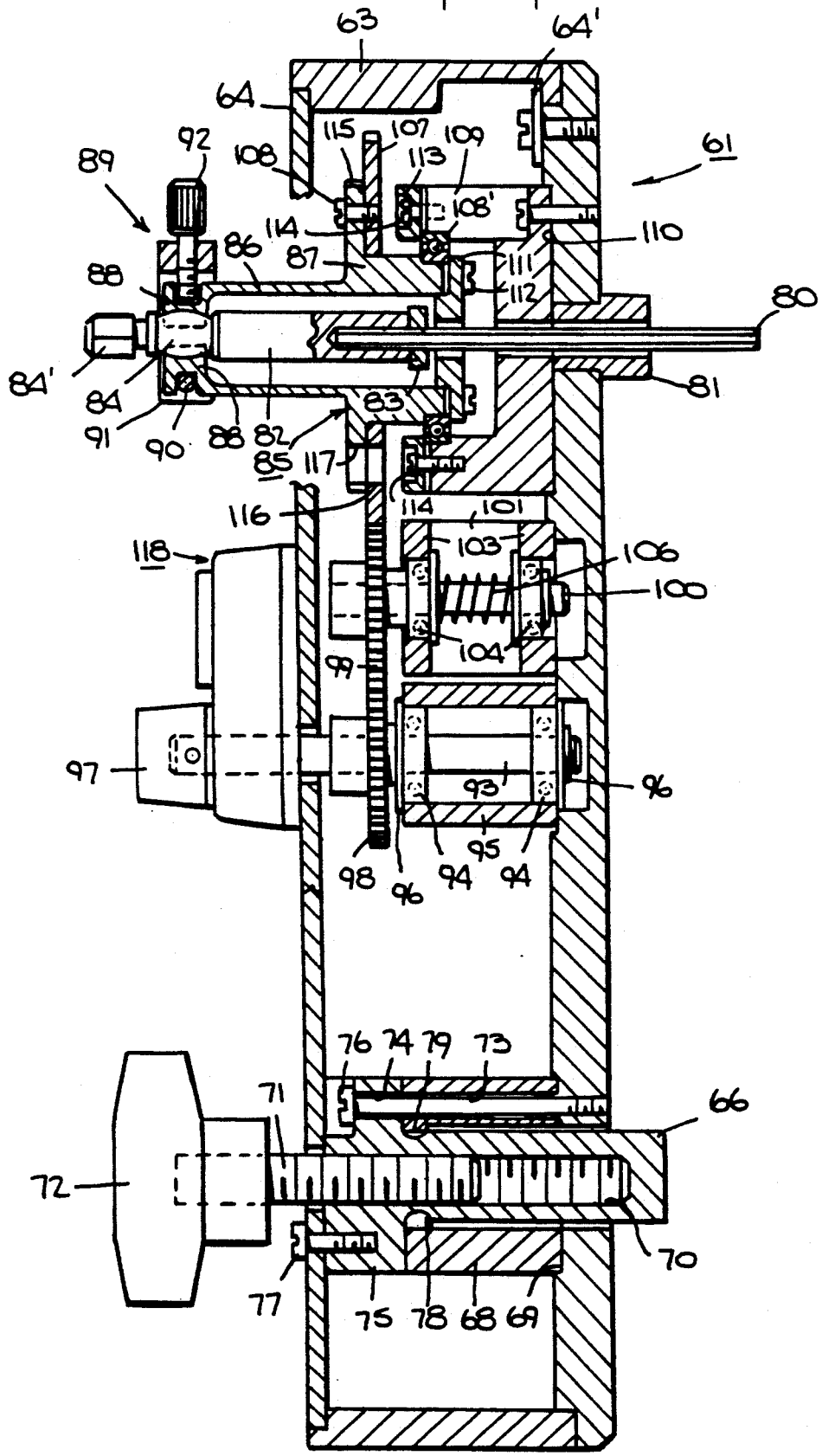
FIG. 3 illustrates a view taken on line 3—3 of FIG. 2.

Referring to FIGS. 2 and 3, an indexing mechanism 61 in the form of a gear head is provided for the simultaneous rotation of the micrometer screws 52. This indexing mechanism 61 includes a housing formed of a base plate 62, a plastic annular sidewall 63 and a cover plate 64 which is of a compact size so as to be readily handled manually for example having an outer diameter of 9 inches and a thickness of 1.75 inches. As indicated in FIG. 2, the sidewall 63 is secured to the base plate 62 by means of a plurality of washers 64' which overly an inwardly directed flange on the sidewall 63 and a plurality of screws 65 which pass through the washers 64' into threaded engagement with the base plate 62.

The indexing mechanism 61 also includes a means for releasably engaging with a grind wheel 30 in order to be locked to the grind wheel 30. Such means may be in the form of a plurality of circumferentially spaced expandable locking bushings 66 which project from the base plate 62 and which engage in circular recesses 67 formed in the grind disc 30 (see FIG. 4). As indicated in FIG. 3, each locking bushing 66 is of bolt shape and is coaxially disposed in a bearing support 68 which is mounted in a circular recess 69 of the base plate 62. Each bushing 66 has an internally threaded bore 70 which receives a threaded shank 71 of a knob 72. In addition, each bushing 66 is longitudinally split, for example, with two diametrically opposed slots which extend along a substantial length of the bushing 66 and which are disposed so that upon threading in of the shank 71 of the knob 72, the two split portions of the bushing 66 expand radially outwardly. In this way, the bushing 66 serves to firmly engage within a respective recess 67 of a grinding disc 30 (see FIG. 4). The bearing support 68 includes a through bore 73 which is aligned with a through bore 74 in a head 75 of the bushing 66 so as to receive a securing bolt 76. As indicated in FIG. 3, the bolt 76 is threaded into the base plate 62 in order to secure the bushing 66 and bracket 68 in place. In addition, one or more locking screws 77 are passed through the cover 64 into threaded engagement with the head 75 of the bushing 66 in order to secure the plate 64 thereto.

As indicated in FIG. 3, each locking bushing 66 also has a pair of oppositely disposed notches 78 adjacent the head 75 to provide a reduced cross section for easier flexure and expansion of the split portions when engaging and locking into the grinding disc (not shown). The bracket 68 has an inwardly directed lip or collar 79 to guide the bushing 66 in place.

Referring to FIG. 3, the indexing mechanism 61 also has a plurality of circumferentially spaced drive pins 80 of hexagonal cross section which project from and which are rotatably mounted in the housing for engaging in the micrometer screws 52 as well as a transmission means in the housing for rotating the pins 80 simultaneously.

As indicated in FIG. 3, each drive pin 80 passes through a protective bushing 81 mounted in the base plate 62 of the housing and is received in a pin holder 82. A rubber washer 83 is disposed about the pin 80 and abuts against the pin holder 82 in order to cushion the insertion of the pin 30 into a micrometer screw 52.

Each pin holder 82 has a knob 84' on an end projecting out of the housing of the indexing mechanism 61 as well as a rounded part 84 adjacent to the knob 84'. In addition, a rotatable drive hub 85 is disposed concentrically about the pin holder 82 with the knob 84' extending outwardly therefrom. Each drive hub 85 has a split sleeve-like portion 86 which extends from a hub portion 87 and which has a pair of oppositely disposed ears 88 which engage the rounded part 84 of the pin holder 82 in rotatable relation. In this way, the knob 84' can be rotated so as to align a drive pin 80 with a hexagonal bore 55 in a locking ring 54 of a micrometer screw 52.

A clamping means is also provided for clamping the ends of the split portion 86 of the drive hub 85 on the rounded part 84 of the pin holder 82. For example, as shown, the clamping means includes a U-shaped clamp 89 which sits over the split portion 86 of the drive hub 85, a pin 90 which extends across two legs of the clamp and which is received in suitable openings in the legs 91 of the clamp 89 and a threaded screw 92 which is threaded through a base of the clamp 89 against one of the halves of the split portion 86. Thus, upon threading in of the screw 92 into the clamp 89, the screw 92 forces the two parts of the split portion 86 of the drive hub 85 into clamping relation on the pin holder 82.

The transmission means in the housing for rotating the pins 80 simultaneously includes a central gear shaft 93 which is rotatably mounted by a pair of bearings 94 in a central bracket 95 secured to the base plate 62 via bolts (not shown). A pair of retaining rings 96 are also disposed on the shaft 93 at opposite ends of the bracket 95 to secure the bearings 94 therein. The central shaft 93 also extends out of the cover 64 of the housing to receive a knob 97 thereon for manual rotation of the shaft 93. In addition, an inner gear 98 is secured on the shaft in any suitable manner for rotation therewith.

The transmission also includes three intermediate gears 99 (see FIG. 3) which are in meshing relation with the central gear 98. As indicated in FIG. 3, each intermediate gear 99 is secured on an intermediate gear shaft 100 which, in turn, is mounted in an intermediate bracket 101 secured as by a pair of bolts 102 (see FIG. 2) to the base plate 62. Each bracket 101 has a pair of parallel flexure walls 103 which mount the shaft 100 therein via a pair of bearings 104. As indicated in FIG. 2, a single screw 105 passes through one wall 104 into threaded engagement with the opposite wall 104. In addition, as indicated in FIG. 3, a compression spring 106 is disposed between the bearings 104. Thus, upon threading of the screw 105 in one direction, the two flexure walls 103 bend toward each other to remove any clearance between the bearings 104, shaft 100 and the bracket bores. Internal clearances in the bearings 104 may also be removed at the same time.

Referring to FIG. 2, the transmission also includes three outer gears 107 each of which is in meshing relation with an intermediate gear 99. As indicated in FIG. 3, each outer gear 107 is secured via screws 108 to the hub portion 87 of a drive hub 85. Further, each drive hub 85 is mounted via a bearing 108' in an outer bearing block 109 within a radially disposed recess 110 of the base plate 62. As indicated, a plate 111 is secured as by screws 112 to the hub portion 87 in order to retain the bearing 108' in place. Likewise, a retaining ring 113 is secured via screws 114 to the outer bearing block 109 to secure the bearing 108 thereto. In this respect, the gear 107 and a flange 115 of the drive hub 85 are provided with access openings 116, 117, respectively for passage of a suitable tool such as a screw driver for removing the screws 114 and the plate 113 for disassembly purposes.

Each of the outer bearing blocks 109 and each of the intermediate bearing blocks 103 is radially adjustable relative to the central gear 99 via enlarged bolt holes in the respective blocks so as to permit adjustments relative thereto.

Figure 4:
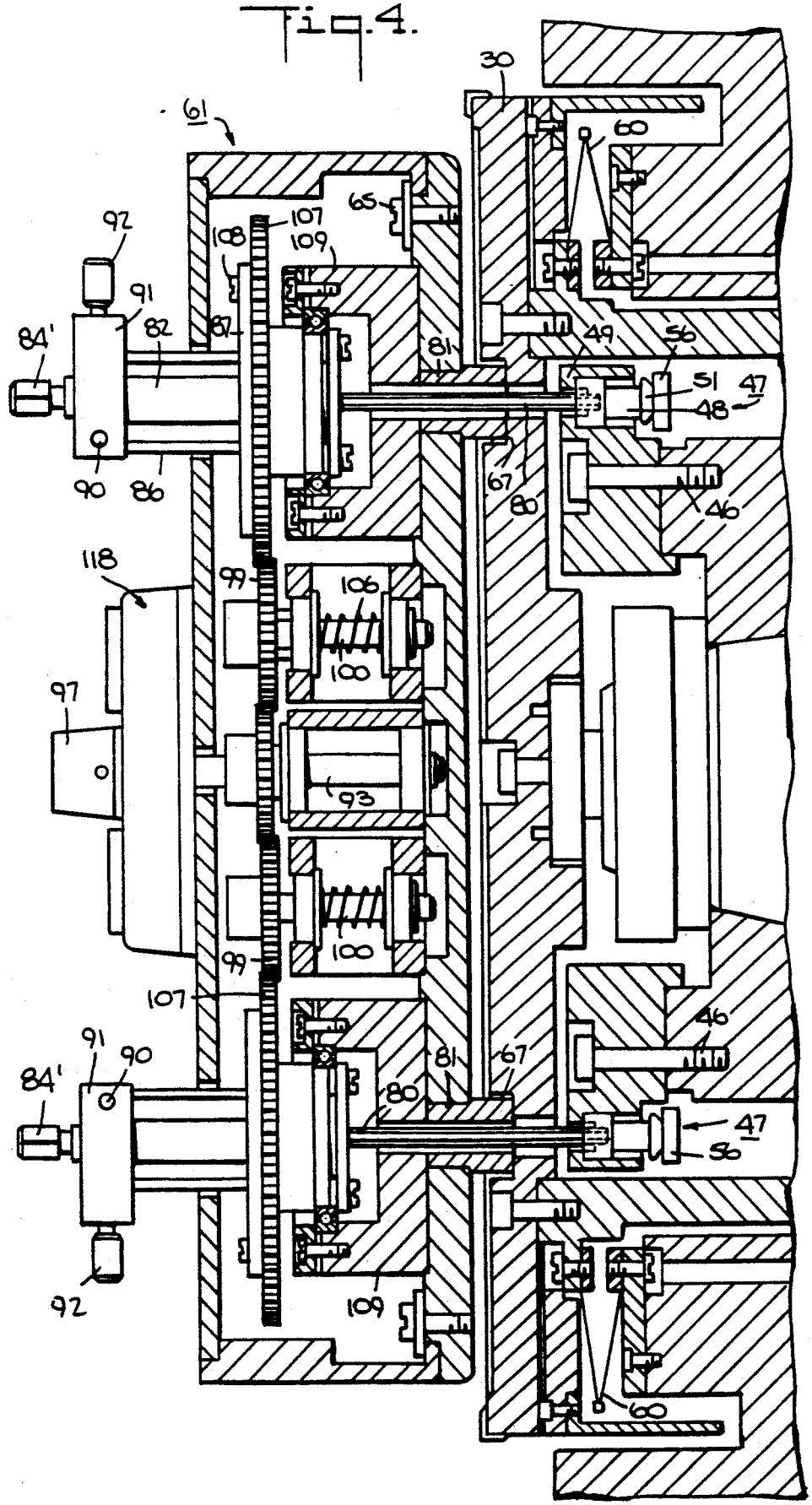
FIG. 4 illustrates a cross sectional view of the indexing mechanism in place on the grind wheel of the system of FIG. 1.

Referring to FIG. 4, in order to change the fine adjustment of the grind wheel disc 30, the grind wheel 28 is brought into a retracted position with the saw blade disposed in coaxial relation. At this time, the indexing mechanism 61 is brought into engagement with the grind wheel disc 30 and the expandable bushings 66 are inserted into the recesses 67 of the grind wheel disc 30 and expanded therein via turning of the respective knob 72. Next, each drive pin 80 is moved into the hexagonal bore 55 of the locking ring 54 in a respective micrometer screw 52. Once the drive pin 80 is properly aligned, the clamping screw 92 is tightened to clamp the drive pin 80 to the drive hub 85. Next, after insertion and clamping of each drive pin 80 the knob 97 is rotated in the direction desired so that the transmission gears 98, 99, 107 cause a simultaneous rotation of the drive pins 80 and thus the micrometer screws 52. Upon reaching a desired position, the rotation of the knob 97 ceases. To this end, as indicated in FIGS. 3 and 4, a digital counter 118 is provided in interconnected relation with the central gear shaft 93 in order to visually display the degree of rotation of the knob 77 and thus each drive pin 80. The transmission is calibrated such that the digit on the right hand of the counter represents 0.0001 inch micrometer stop movement. Likewise, one revolution of the knob 97 changes the micrometer stop position 0.0100 inches.

The construction of the indexing mechanism 61 and the adjustment means 47 is such that the micrometer screws 52 are each moveable over a range of 6,000 microns.

After the adjustment is made, the indexing mechanism 61 is removed and the normal operation of the slicing and grinding machine performed. At this time, as shown in FIG. 6, the grind wheel disc 30 is brought against the face of an ingot and as the housing 25 subsequently descends, the grind wheel disc 30 grinds the face of the ingot while the saw blade slices through the ingot 12 to form a wafer. In this respect, the face 29 of the ingot 12 and, thus, the sliced wafer is ground to a plane parallel to the plane in which the grinding surface 30' of the grind disc 30 moves i.e. perpendicular to the axis of rotation of the spindle 16

Referring to FIG. 4, the indexing mechanism 61 is of generally lightweight construction and can be readily manipulated by one person. Further, the central gear 93 is coaxial of the axis of the rotation of the grind wheel 28 when mounted on the grind wheel disc 30. In addition, each micrometer screw 52 is disposed on an axis parallel to the axis of rotation of the grind wheel 28 and spaced inwardly of an axis of rotation of a respective drive pin 80 in order to avoid engagement backlash between the pin 80 and screw 52. For example, the drive pin 80 may be mounted on an axis of rotation which is spaced radially inwardly approximately 0.050 inches from the axis of rotation of a micrometer screw 52.

Upon completion of the downward movement of the spindle housing 15, the wafer sliced from the ingot 12 has been ground flat. At this time, the pressurized flow of fluid into the spindle 16 ceases via suitable controls (not shown). The spindle bore 17 is then vented, for example, to atmosphere, so that the spring 33 pulls the rod 32 and thus the grind wheel 28 back into the retracted position. During this time, any air which leaks out of the chamber 40 past the seal 41 is vented through a passageway into the space between the wheel head 22 and backing plate 25.

Once the grind wheel 28 has been retracted a sufficient distance from the ingot 12, the ingot 12 may be indexed by suitable means (not shown) so as to move into the plane of the saw blade 24. Thereafter, the spindle housing 15 can be moved downwardly so as to conduct a further slicing and grinding operation to sever and grind a further wafer from the ingot 12.

Thus, during one cycle of the slicing machine, a wafer is first severed from an ingot 12 and at the same time the exposed face of the ingot 12 is ground flat.

The invention thus provides a slicing and grinding system for a wafer slicing machine which can be readily adapted to the slicing and grinding of wafers of different thicknesses.

Further, the invention provides a grinding system for a slicing machine which can be readily adjusted from time-to-time so as to adjust the plane of the grinding disc.

Further, the invention provides a grinding assembly which can be precisely indexed.

What is claimed is:

1. A slicing and grinding system for a wafer slicing machine comprising
   a rotatably mounted internal diameter saw blade for slicing a wafer from a face of an ingot;
   a rotatably mounted grind wheel coaxially mounted relative to said blade on a common axis for simultaneously grinding a front surface of a wafer being sliced from an ingot;
   a plurality of adjusting means disposed in circumferentially spaced manner about said grind wheel for adjusting an extended position of said grind wheel relative to a plane of the front face of a wafer to be sliced from the ingot; and
   means for simultaneously actuating said plurality of adjusting means to precisely index said grind wheel longitudinally of said axis.

2. A system as set forth in claim 1 which further comprises means for moving said grind wheel between a retracted position relative to said saw blade and an extended position for grinding the front surface of a wafer being sliced from an ingot.

3. A system as set forth in claim 2 wherein said means for moving said grind wheel includes an adaptor having an annular chamber coaxial of said axis, an annular sleeve-like piston secured to said grind wheel and slidably received in said chamber, and means for supplying a pressurized fluid to said chamber to expel said piston to move said grind wheel to said extended position.

4. A system as set forth in claim 3 wherein each adjusting means includes a stop adjustably mounted in said adaptor for abutting said piston in said extended position.

5. A system as set forth in claim 4 wherein each stop is a treaded micrometer screw.

6. A system as set forth in claim 5 wherein said grind wheel includes a plurality of circumferentially spaced access openings, each opening being aligned coaxially with a respective micrometer screw.

7. A system as set forth in claim 5 wherein each screw is axially movable over a range of 6,000 microns.

8. In combination,
   a grind wheel disposed on an axis of rotation and including a plurality of access openings;
   a plurality of adjusting means disposed in circumferentially spaced manner about and on one side of said grind wheel for adjusting a position of said grind wheel relative to a place perpendicular to said axis of rotation, each adjusting means including a threadably mounted micrometer screw coaxially aligned with a respective access opening for establishing a grinding position of said grind wheel;
   a gear head on an opposite side of said grind wheel for simultaneously actuating said plurality of adjusting means to precisely index said grind wheel longitudinally of said axis;
   a plurality of drive pins on said gear head and means for rotating said pins simultaneously, each said drive pin being sized to pass through a respective opening in said grind wheel into engagement with a respective screw for rotating said screw, said means for rotating said pins including a manually rotatable knob and a transmission between said knob and said pins for rotating said pins in unison with said knob;
   said transmission including a central gear rotatably connected with said knob, a plurality of intermediate gears in meshing relation with said central gear with each intermediate gear having a shaft, a plurality of outer gears, each outer gear being in meshing relation with a respective intermediate gear and rotatably secured to a respective pin; and
   an intermediate bearing block having a pair of parallel flexure walls mounting said shaft therein, a compression spring between said walls and biasing said walls apat and a screw passing through one wall into threaded engagement with the other wall for taking up slack between said intermediate gear shaft and said walls.

9. In combination,
   a grind wheel disposed on an axis of rotation and including a plurality of access openings;
   a plurality of adjusting means disposed in circumferentially spaced manner about and on one side of said grind wheel for adjusting a position of said grind wheel relative to a plane perpendicular to said axis of rotation, each adjusting means including a threadably mounted micrometer screw coaxially aligned with a respective access opening for establishing a grinding position of said grind wheel, a sleeve having a split internally threaded portion threadably receiving said micrometer screw therein and a friction ring threaded onto said split portion to retain said screw therein;
   a gear head on an opposite side of said grind wheel for simultaneously actuating said plurality of adjusting means to precise index said grind wheel longitudinally of said axis; and
   a plurality of drive pins on said gear head and means for rotating said pins simultaneously, each said drive pin being sized to pass through a respective opening in said grind wheel into engagement with a respective screw for rotating said screw.

10. The combination as set forth in claim 9 wherein said means for rotating said pins includes a manually rotatable knob and a transmission between said knob and said pins for rotating said pins in unison with said knob.

11. The combination as set forth in claim 10 which further comprises a counter for manually displaying the degree of rotation of said knob and the corresponding calibrated axial position of said grind wheel.

12. The combination as set forth in claim 10 wherein said transmission includes a central gear rotatably connected with said knob, a plurality of intermediate gears in meshing relation with said central gear and a plurality of outer gears each outer gear being in meshing relation with a respective intermediate gear and rotatably secured to a respective pin.

13. The combination as set forth in claim 9 wherein each micrometer screw has a socket for receiving a respective pin therein in mating relation.

14. A mechanism for indexing a grind wheel, said mechanism comprising a housing;

first means for releasably engaging said housing with a grind wheel to lock said housing to the grind wheel, said first means including a plurality of circumferentially spaced expandable locking bushings projecting from said housing;

a plurality of circumferentially spaced drive pins projecting from and rotatably mounted in said housing for engaging in adjusting means for controlling a grinding position of the grind wheel; and second means in said housing for rotating said pins simultaneously to adjust the adjusting means.

15. A mechanism as set forth in claim 14 wherein said second means includes a manually rotatable knob and a transmission between said knob and said pins for rotating said pins in unison with said knob.

16. A mechanism as set forth in claim 15 which further comprises a counter for manually displaying the degree of rotation of said knob.

17. A mechanism as set forth in claim 15 wherein said transmission includes a central gear rotatably connected with said knob, a plurality of intermediate gears in meshing relation with said central gear and a plurality of outer gears, each outer gear being in meshing relation with a respective intermediate gear and rotatably secured to a respective pin.

18. A mechanism as set forth in claim 17 which further comprises a shaft mounting a respective intermediate gear thereon, an intermediate bearing block having a pair of parallel flexure walls mounting said shaft therein, a compression spring between said walls and biasing said walls apart and a screw passing through one wall into threaded engagement with the other wall for taking up slack between said shaft and said walls.

19. A mechanism as set forth in claim 17 wherein each intermediate gear and each outer gear is radially adjustably relative to said central gear.

20. A mechanism as set forth in claim 14 which further comprises a plurality of rotatable drive hubs, each hub having a respective drive pin mounted therein and being drivingly connected to said second means for rotation thereby.

21. In combination, a grind wheel disposed on an axis of rotation and including a plurality of access openings;

a plurality of adjusting means disposed in circumferentially spaced manner about and on one side of said grind wheel for adjusting a position of said grind wheel relative to a plane perpendicular to said axis of rotation, each adjusting means including a threadably mounted micrometer screw coaxially aligned with a respective access opening for establishing a grinding position of said grind wheel;

a gear head on an opposite side of said grind wheel for simultaneously actuating said plurality of adjusting means to precisely index said grind wheel longitudinally of said axis;

a plurality of drive pins on said gear head and means for rotating said pins simultaneously, each said drive pin being sized to pass through a respective opening in said grind wheel into engagement with a respective screw for rotating said screw, said means for rotating said pins including a manually rotatable knob and a transmission between said knob and said pins for rotating said pins in unison with said knob;

said transmission including a central gear rotatably connected with said knob, a plurality of intermediate gears in meshing relation with said central gear and a plurality of outer gears, each outer gear being in meshing relation with a respective intermediate gear and rotatably secured to a respective pins, each intermediate gear and each outer gear being radially adjustable relative to said center gear.

22. In combination, a grind wheel disposed on an axis of rotation and including a plurality of access opening and a plurality of circumferentially spaced recesses;

a plurality of adjusting means disposed in circumferentially spaced manner about and on one side of said grind wheel for adjusting a position of said grind wheel relative to a plane perpendicular to said axis of rotation, each adjusting means including a threadably mounted micrometer screw coaxially aligned with a respective access opening for establishing a grinding position of said grind wheel; and a gear head on an opposite side of said grind wheel for simultaneously actuating said plurality of adjusting means to precisely index said grind wheel longitudinally of said axis, said gear head including a plurality of circumferentially spaced expandable locking bushings for engaging in said recesses of said grind wheel to lock said gear head to said grind wheel, a plurality of drive pins and means for rotating said pins simultaneously, each said drive pin being sized to pass through a respective opening in said grind wheel into engagement with a respective screw for rotating said screw.

23. A mechanism for indexing a grind wheel, said mechanism comprising a housing;

first means for releasably engaging said housing with a grind wheel to lock said housing to the grind wheel;

a plurality of circumferentially spaced drive pins projecting from and rotatably mounted in said housing for engaging in adjusting means for controlling a grinding position of the grind wheel;

second means in said housing for rotating said pins simultaneously to adjust the adjusting means;

a plurality of rotatable drive hubs, each hub having a respective drive pin mounted therein and being drivingly connected to said second means for rotation thereby, each drive hub having a longitudinally split portion rotatably receiving a respective drive pin therein; and a clamp for clamping each split portion onto said respective drive pin for rotation thereof.

* * * * *